United States Patent
Sayeed

(10) Patent No.: US 8,155,170 B2
(45) Date of Patent: Apr. 10, 2012

(54) METHOD AND APPARATUS FOR ACHIEVING CHANNEL VARIABILITY IN SPREAD SPECTRUM COMMUNICATION SYSTEMS

(75) Inventor: Zulfiquar Sayeed, East Windsor, NJ (US)

(73) Assignee: Alcatel Lucent, Paris (FR)

( * ) Notice: Subject to any disclaimer, the term of this patent is extended or adjusted under 35 U.S.C. 154(b) by 902 days.

(21) Appl. No.: 11/923,088

(22) Filed: Oct. 24, 2007

(65) Prior Publication Data

US 2008/0260007 A1   Oct. 23, 2008

Related U.S. Application Data

(60) Division of application No. 10/155,144, filed on May 24, 2002, now Pat. No. 7,324,580, which is a continuation of application No. 09/184,613, filed on Nov. 2, 1998, now abandoned.

(51) Int. Cl.
H04B 1/69 (2011.01)
H04B 1/707 (2011.01)
H04B 1/713 (2011.01)

(52) U.S. Cl. ........ 375/147; 375/146; 375/343; 375/140; 375/150; 375/152; 370/320; 370/335

(58) Field of Classification Search .......... 375/147, 375/150, 152, 142, 143, 149, 146, 140, 141, 375/343; 370/320, 335
See application file for complete search history.

(56) References Cited

U.S. PATENT DOCUMENTS

| | | | |
|---|---|---|---|
| 3,985,968 A | 10/1976 | Stelzenmuller et al. | |
| 5,652,764 A * | 7/1997 | Kanzaki et al. | 375/130 |
| 5,757,767 A | 5/1998 | Zehavi | |
| 5,864,548 A | 1/1999 | Liu | |
| 6,041,034 A | 3/2000 | Fukumasa et al. | |
| 6,222,873 B1 | 4/2001 | Bang et al. | 375/146 |

FOREIGN PATENT DOCUMENTS

JP   8046591   2/1996

OTHER PUBLICATIONS

Golomb et al, "The search for Hadamard Matrices", Jet Propulsion Laboratory, California Institute of Technology, published Jan. 1963, pp. 12-17.*

Dinan et al.,"Spreading Codes for Direct Sequence CDMA and Wideband CDMA Cellular Networks," IEEE Communications Magazine, IEEE Service Center, Piscataway, NJ, vol. 36, No. 9 (1998).

(Continued)

*Primary Examiner* — Phuong Phu
(74) *Attorney, Agent, or Firm* — Ryan, Mason & Lewis, LLP

(57) ABSTRACT

A method and apparatus are disclosed for modulating a communication signal in a code division multiple access (CDMA) environment using orthogonal N by N Hadamard spread spectrum codes Orthogonal spreading codes are used that have lengths that are not a power-of 2 to provide additional channel variability for various multimedia applications and increase the flexibility of the number of channels/bandwidth relationship. The Hadamard codes are multiples of 4 (4n) and demonstrate a good cross-correlation property, making them very useful in the flexible design of code division multiple access (CDMA) systems. A transmitter encodes each of N data streams (N not being a power of 2), to be transmitted using a 4n codeword, $N_i$. The received signal is passed through a filter matched to the characteristics of the appropriate codeword, $N_i$, and PN spreading sequence.

12 Claims, 7 Drawing Sheets

OTHER PUBLICATIONS

K.G. Beauchamp, Walsh Functions and Their Applications, Ch. 7, 140-47 (Academic Press 1975).

Martin Allen Agulnek, Thesis, Application of the Hadamard Transform to Pattern Recognition and Image Processing, Washington University, Seventh Institute of Technology (1972).

Golomb, et al., "The Search for Hadamard Matrices," American Math Monthly 70, pp. 12-17 (1963).

Yang et al., "Generation of Hadamard matrices for phase-code-multiplexed holographic memories," Optics Letters, vol. 21, No. 14, pp. 1067-1069 (Jul. 15, 1996).

* cited by examiner

METHOD AND APPARATUS FOR ACHIEVING CHANNEL VARIABILITY IN SPREAD SPECTRUM COMMUNICATION SYSTEMS

CROSS-REFERENCE OF RELATED APPLICATION

This application is a divisional application of U.S. patent application Ser. No. 10/155,144, filed May 24, 2002 now U.S. Pat. No. 7,324,580 which is a continuation of U.S. patent application Ser. No. 09/184,613, filed Nov. 2, 1998, now abandoned each incorporated by reference herein.

FIELD OF THE INVENTION

The present invention relates to cellular and other wireless communication systems, and more particularly, to methods and apparatus for achieving additional channels in a given bandwidth for a communication system utilizing code division multiple access (CDMA) techniques.

BACKGROUND OF THE INVENTION

Code division multiple access (CDMA) techniques have been employed in many digital wireless communication systems to permit a large number of system users to communicate with one another. Code division multiple access (CDMA) techniques transmit multiple information signals on the same channel, and differentiate each user sub-channel by encoding the channel with a unique spreading code. Many communication systems utilizing code division multiple access (CDMA) techniques comply with the IS-95 standard, adopted by the Telecommunication Industry Association (TIA). Under the IS-95 standard, a communication system substantially eliminates co-channel interference and improves the bit energy-to-noise density ratio, $E_b/N_o$, on the forward link from a base station or cell site to a mobile receiver unit by modulating the information signals with Walsh orthogonal function sequences having a length equal to a power of 2 ($2^n$). A more detailed discussion of the IS-95 standard is provided in "Mobile Station-Base Station Compatibility Standard for Dual-Mode Wideband Spread Spectrum Cellular System," Telecommunication Industry Association Doc No TIA/EIA/IS-95 (1993), incorporated by reference herein.

Walsh orthogonal function sequences having a length equal to a power of 2 exhibit excellent cross correlation properties that optimize the detection of the transmitted information (each codeword goes to zero unless modulated by itself). The constraint on the code length, however, directly limits the number of channels that can be supported in a given bandwidth. While "power of 2" Walsh codes are suitable for many applications that can match the number of channels to the available bandwidth, the efficiency and utility of CDMA networks could be significantly extended if further variation on the number of channels could be achieved.

Specifically, since each Walsh code must have a length that is equal to a power of 2, only a limited number of channel and bandwidth combinations are supported efficiently For example, if a broadcasting system transmits 72 channels of audio information using current code division multiple access (CDMA) technology, then Walsh codes having a length of 128 must be utilized. Assuming each channel includes 96 Kilobits-per-second (Kbps) of audio information, the required system bandwidth is 12.29 Megahertz (MHz) (96 Kbps times 128 channels) and the bandwidth overhead is 5 38 Megahertz (MHz) (96 KBps times (128–72) channels). Thus, a need exists for a code division multiple access (CDMA) transmission system that does not require orthogonal spreading codes having a length that is a power-of 2. A further need exists for a code division multiple access (CDMA) transmission system that accommodates more channels in a given bandwidth.

SUMMARY OF THE INVENTION

Generally, a method and apparatus are disclosed for modulating a communication signal in a code division multiple access (CDMA) environment using orthogonal 4n by 4n Hadamard spread spectrum codes. The present invention improves on conventional CDMA spread spectrum modulation techniques by utilizing orthogonal spreading codes having lengths that are not a power-of 2 to provide additional channel variability for various multimedia applications and increase the flexibility of the number of channels/bandwidth relationship. N by N orthogonal Hadamard matrices exist where N=0 (mod 4) 4n by 4n Hadamard matrices accommodate more users in a given bandwidth.

The Hadamard codes used in accordance with the present invention are multiples of 4 (4n) and demonstrate a good cross-correlation property, making them very useful in the flexible design of code division multiple access (CDMA) systems. A transmitter is disclosed that encodes each of N data streams (N not being a power of 2), to be transmitted using a 4n codeword, $N_i$. The forward link in a CDMA system is a synchronous link, with all user signals arriving at the same time. The received signal is passed through a filter in the receiver that is matched to the characteristics of the appropriate codeword, $N_i$, and PN spreading sequence. Typically, each end user will have a receiver that uses the codeword, $N_i$, corresponding to the channel that the user desires to receive. The receiver for the i-th user must synchronize its PN-orthogonal code sequence to the appropriate lag due to the channel transmission delay.

A more complete understanding of the present invention, as well as further features and advantages of the present invention, will be obtained by reference to the following detailed description and drawings.

DETAILED DESCRIPTION

The present invention relates to a method and apparatus for modulating a communication signal in a code division multiple access (CDMA) environment using orthogonal spread spectrum codes. As discussed further below, conventional CDMA spread spectrum modulation techniques with orthogonal codes require spreading codes that have a length that is a power of 2 ($2^n$). The present invention improves on conventional CDMA spread spectrum modulation techniques by utilizing orthogonal spreading codes having lengths that are not a power-of 2 to provide additional channel variability for various multimedia applications. Specifically, by using 4n by 4n Hadamard matrices in accordance with the present invention, more users are accommodated in the given bandwidth. N by N orthogonal Hadamard matrices exist where N=0 (mod 4) Thus, the present invention utilizes Hadamard codes that are multiples of 4 (4n).

Thus, the present invention provides greater flexibility in designing CDMA communication systems. As previously indicated, requiring Walsh codes having lengths that are powers of 2, such as 32, 64 or 128, greatly restricts the number of users that can share a certain bandwidth. By using 4n length codes, the present invention increases the flexibility of the number of channels/bandwidth relationship. It has been found that Hadamard codes having a length of 4n demonstrate a good cross-correlation property, making them very useful in the flexible design of code division multiple access (CDMA) systems.

As previously indicated, it is often desirable to differentiate a number of information signals transmitted on the same carrier frequency with unique orthogonal spread spectrum codes. This is typically accomplished by encoding each bit to be transmitted using a predefined codeword, or pattern, consisting of n "chips" or "signal elements." A number of orthogonal spread spectrum codes, such as Walsh codes, have been discovered which have unique properties that optimize the detection of the transmitted information. Under the IS-95 standard for CDMA networks, for example, sixty four different Walsh codewords, $w_0$ through $w_{63}$, each consisting of sixty four chips, permit 64 different information signals or channels to be transmitted on the same carrier frequency. Since a number of channels are reserved for administration, such as the pilot, synch and paging channels, less than the available sixty four channels typically transmit user information.

Figure 1:
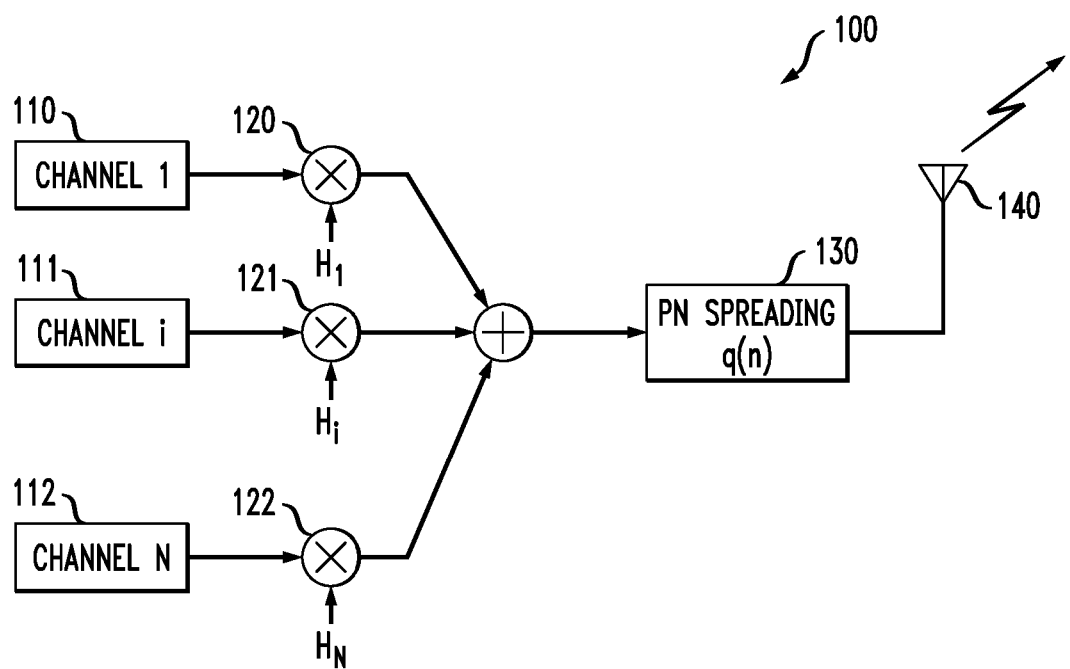
FIG. 1 illustrates a block diagram of a CDMA transmission system that provides a variable number of channels, in accordance with the present invention.

FIG. 1 illustrates a block diagram of a CDMA transmission system 100 that provides a variable number of user streams (or channels), in accordance with the present invention. As shown in FIG. 1, in order to transmit data on the downlink portion of a CDMA system from one or more information sources, such as sources 101-103, to a plurality of end users, a transmitter 100 encodes each of N data streams (N not being a power of 2), to be transmitted using a 4n codeword, $N_i$. In the illustrative implementation N=72 channels. In order to improve the cross correlation properties of the 4n codewords, the encoded signals are multiplied by a PN sequence by a PN spreading stage 130 The PN spreading is discussed further below in a section entitled CROSS CORRELATION WITH PN SPEADING.

Figure 2:
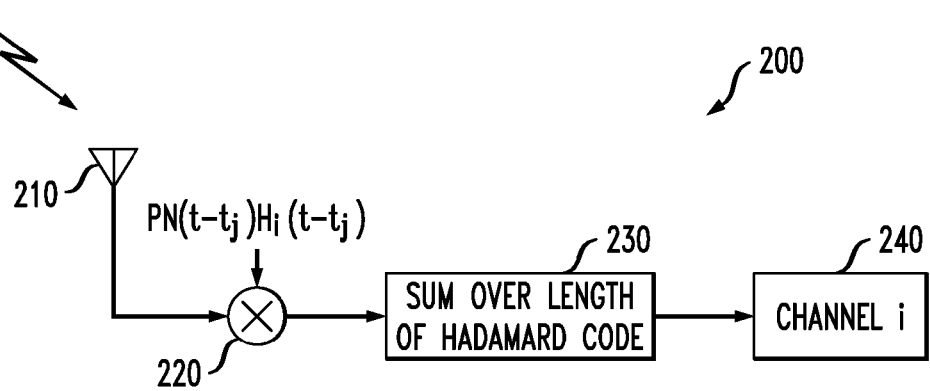
FIG. 2 illustrates a block diagram of a CDMA receiver that receives a variable number of channels, in accordance with the present invention.

The encoded signal will then be combined and modulated in a conventional manner, prior to transmission over a transmission medium 140. The transmission medium 140 may be embodied, for example, as a wireless communications network The modulator may employ a modulation technique, for example, which multiplies the codeword by a sinusoidal carrier wave in order to shift the signal frequency upward to the carrier frequency (not shown) In this manner, the original signal spectrum may be translated into a particular frequency band allocated by the Federal Communications Commission (FCC) or another regulatory body FIG. 2 illustrates a block diagram of a CDMA receiver 200 that provides a variable number of user streams (or channels), in accordance with the present invention. It is noted that the forward link in a CDMA system is a synchronous link, with all user signals arriving at the same time As shown in FIG. 2, the receiver 200 receives the transmitted signal using the antenna 210 and shifts the frequency of the received signal down to the base band by a demodulator, (not shown), thus returning the signal to its original form prior to modulation. Thereafter, the received signal is passed through a filter 220 that is matched to the characteristics of the appropriate codeword, $N_i$, and PN spreading sequence. Typically, each end user will have a receiver 200 that uses the codeword, $N_i$, corresponding to the channel that the user desires to receive. The receiver 200 for the i-th user must synchronize its PN-orthogonal code sequence to the appropriate lag due to the channel transmission delay. The time delay, $t_j$, is the time delay of the j-th path of the multipath between the transmitter 100 and receiver 200. If the estimated channel transmission delay is not the actual channel transmission delay of the channel, then the energy captured from the i-th code will decrease, and the interference will increase. In view of the desire for good energy capture and good rejection of interference, the cross-correlation property of the code set should be evaluated at non-zero lags, discussed below. For a mote detailed discussion of a prior art CDMA communication system, see U.S. Pat. No. 4,901,307, incorporated by reference herein Cross Correlation Properties The primary characteristic for evaluating orthogonal codes for CDMA transmission is the cross-correlation property. The codes used in accordance with the present invention are orthogonal by design. In other words, at the zero-th lag, each code when correlated with itself picks up the most amount of energy, and picks up no energy from all other codes. Mathematically, this is represented as:

$$\frac{1}{N}\sum_{n=1}^{N} H_i(n)H_j(n) = \begin{cases} 1 \text{ if } i=j \\ 0 \text{ otherwise} \end{cases} \quad \text{Eq. (1)}$$

where $H_i$ is the i-th member of the orthogonal set.

Figure 3:
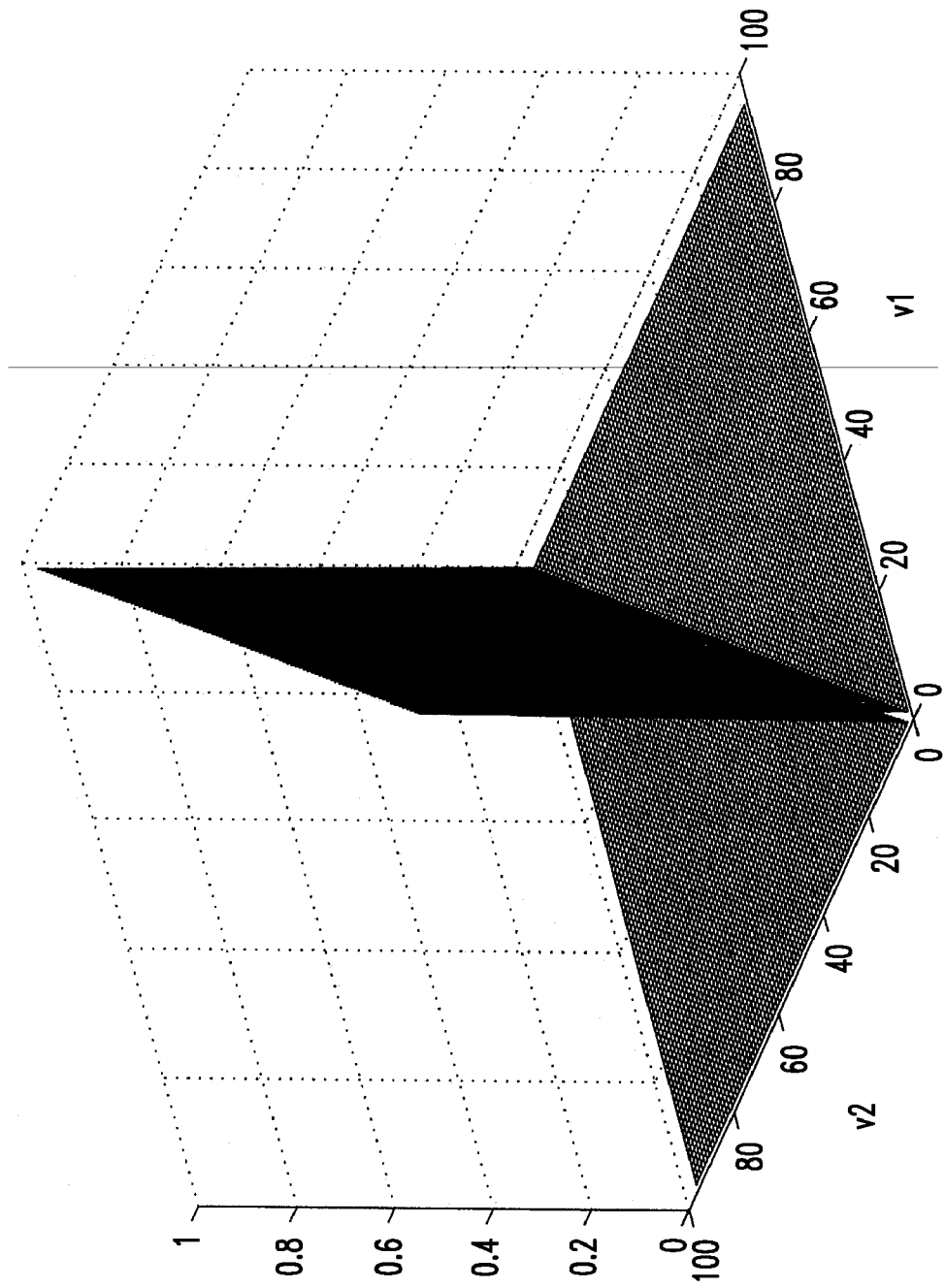
FIG. 3 illustrates the cross-correlation characteristics of the 4n codes at lag zero (no time shift)

As previously indicated, the present invention uses 4n by 4n Hadamard matrices, or Hadamard codes that are multiples of 4 (4n), to permit more users in a given bandwidth. (For a detailed description of Hadamard matrices see, for example, Golomb et al., "The Search for Hadamard Matrices," Jet Propulsion Laboratory, California Institute of Technology, 1963.). For these codes to be useful, they must exhibit good cross-correlation characteristics. The cross-correlation characteristic is evaluated by observing the inner product of each of the 4n vectors with all of the other 4n vectors shifted by one unit of time. By definition, the cross-correlation characteristic of the 4n codes are zero at lag zero (no time shift), shown in FIG. 3. The auto and cross correlation at the zero-th lag demonstrates perfect orthogonality.

The circular correlation of Hadamard $i=H_I$ with the one time shifted Hadamard $j=H_j$ at lag on is given by:

$$corr_{ij} = abs\left(\frac{1}{N}\sum_{n=1}^{N} H_i(n)H_j(n+1)\right) \qquad \text{Eq. (2)}$$

$$= abs\left(\frac{1}{N}\sum_{n=2}^{N} H_i(n)H_j(n+1) + H_i(1)H_j(2)\right) \qquad \text{Eq. (3)}$$

Figure 4:
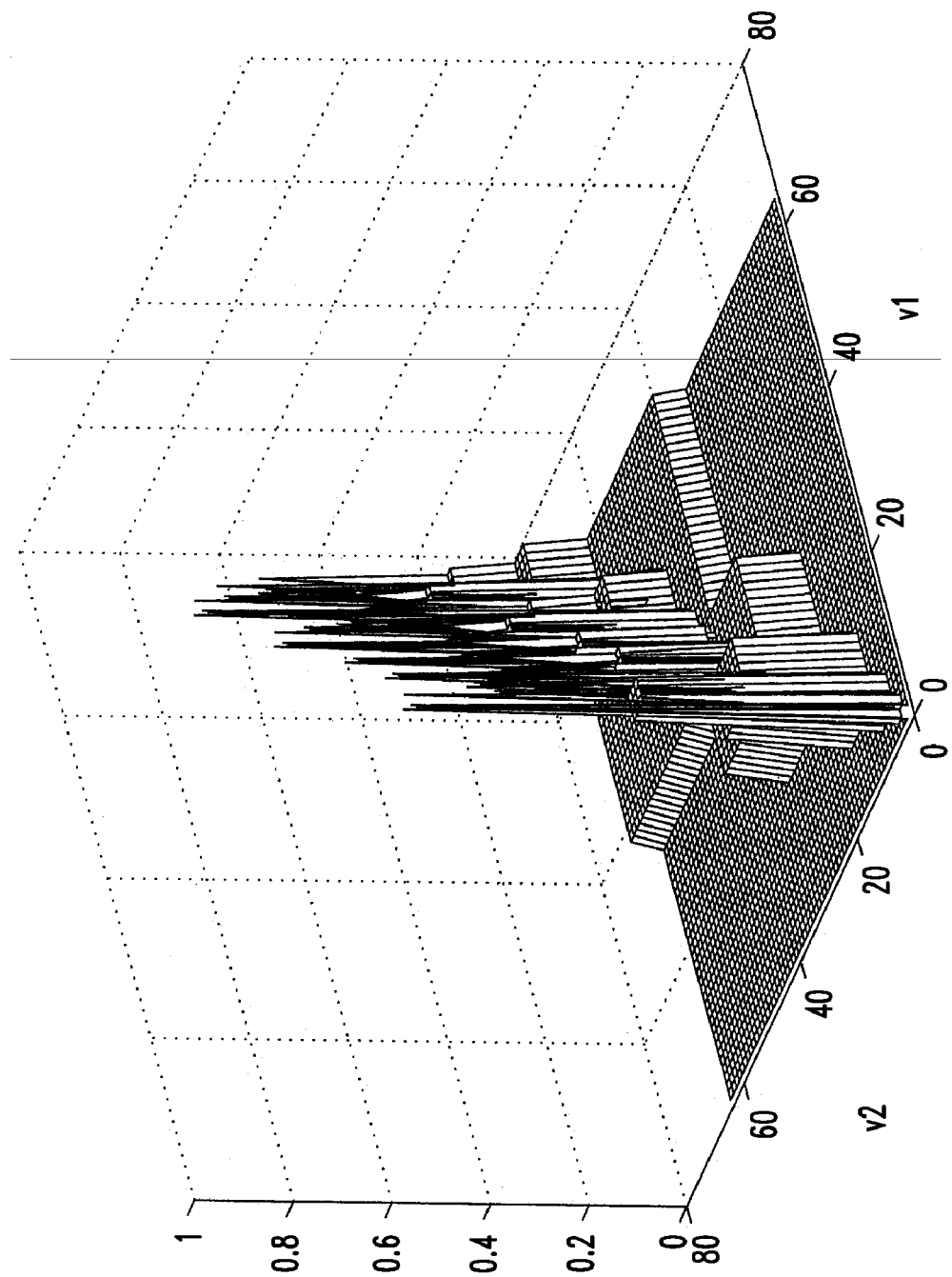
FIGS. 4 and 5 illustrate the correlation where the codes are shifted by one unit of time for Walsh codes of length 64 and for Hadamard (4n) codes of length 96, respectively.
Figure 5:
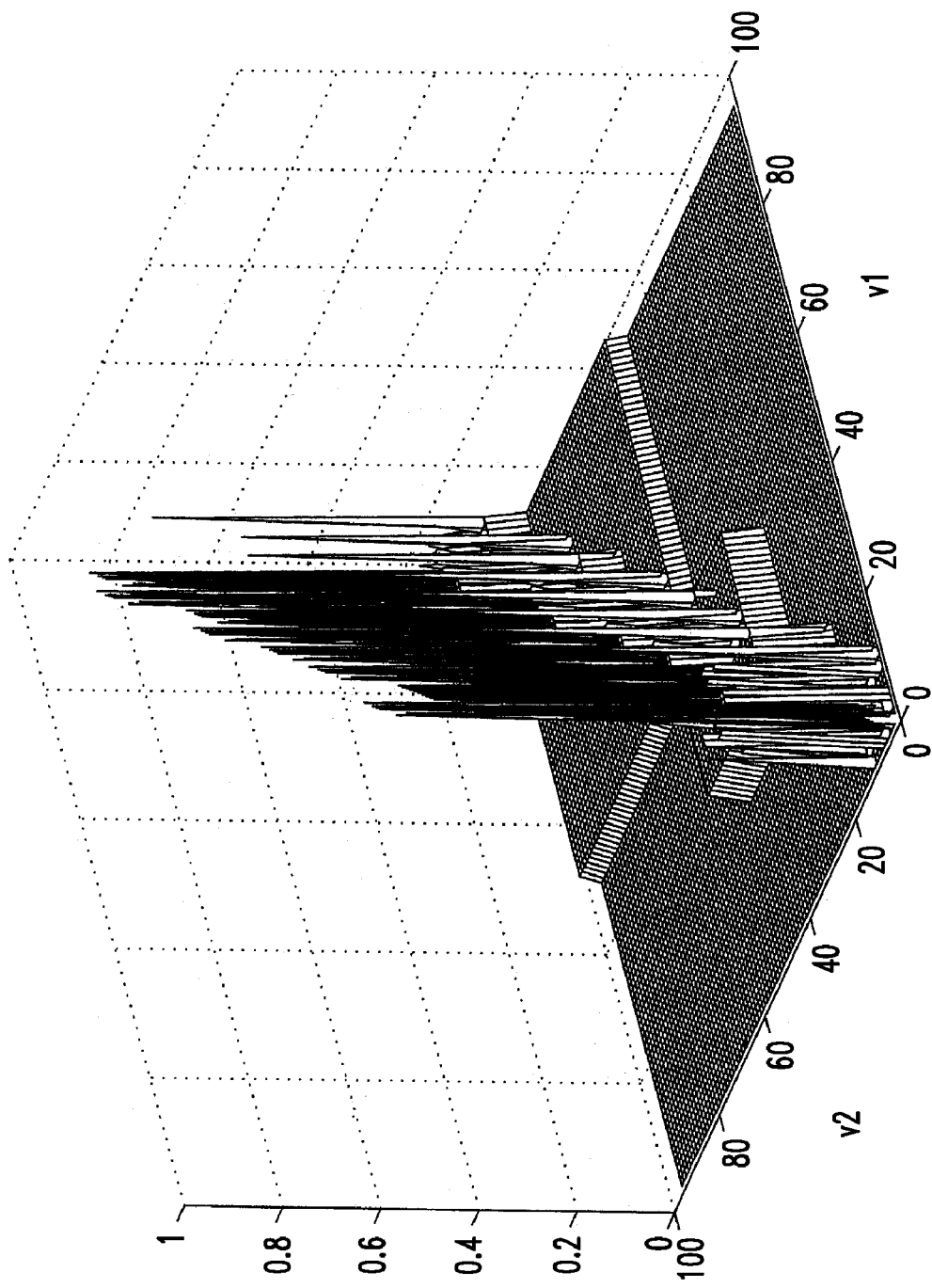

FIGS. 4 and 5 illustrate the correlation where the codes are shifted by one unit of time for Walsh codes of length 64 and for Hadamard (4n) codes of length 96, respectively. It is noted that both the Walsh codes of length 64 and the Hadamard (4n) codes of length 96 show strong cross correlation values on the order of N. The Hadamard (4n) codes of length 96 show a greater number of non-diagonal peaks, suggesting a greater amount of interference from the other user signals due, for example, to time misalignment of the codes. It is further noted that the interference picked up from other users is a function of the IQ PN spreading, as well as the codewords that are used. Thus, the effect of the PN code was considered as well.

Cross Correlation With PN Spreading

The PN code that was used for evaluation purposes was the quadrature code of the IS-95 standard:

$$q(n)=q(n-15)\oplus q(n-12)\oplus q(n-11)\oplus q(n-10)\oplus q(n-9)$$
$$\oplus q(n-5)\oplus q(n-4)\oplus q(n-3)$$

Figure 6:
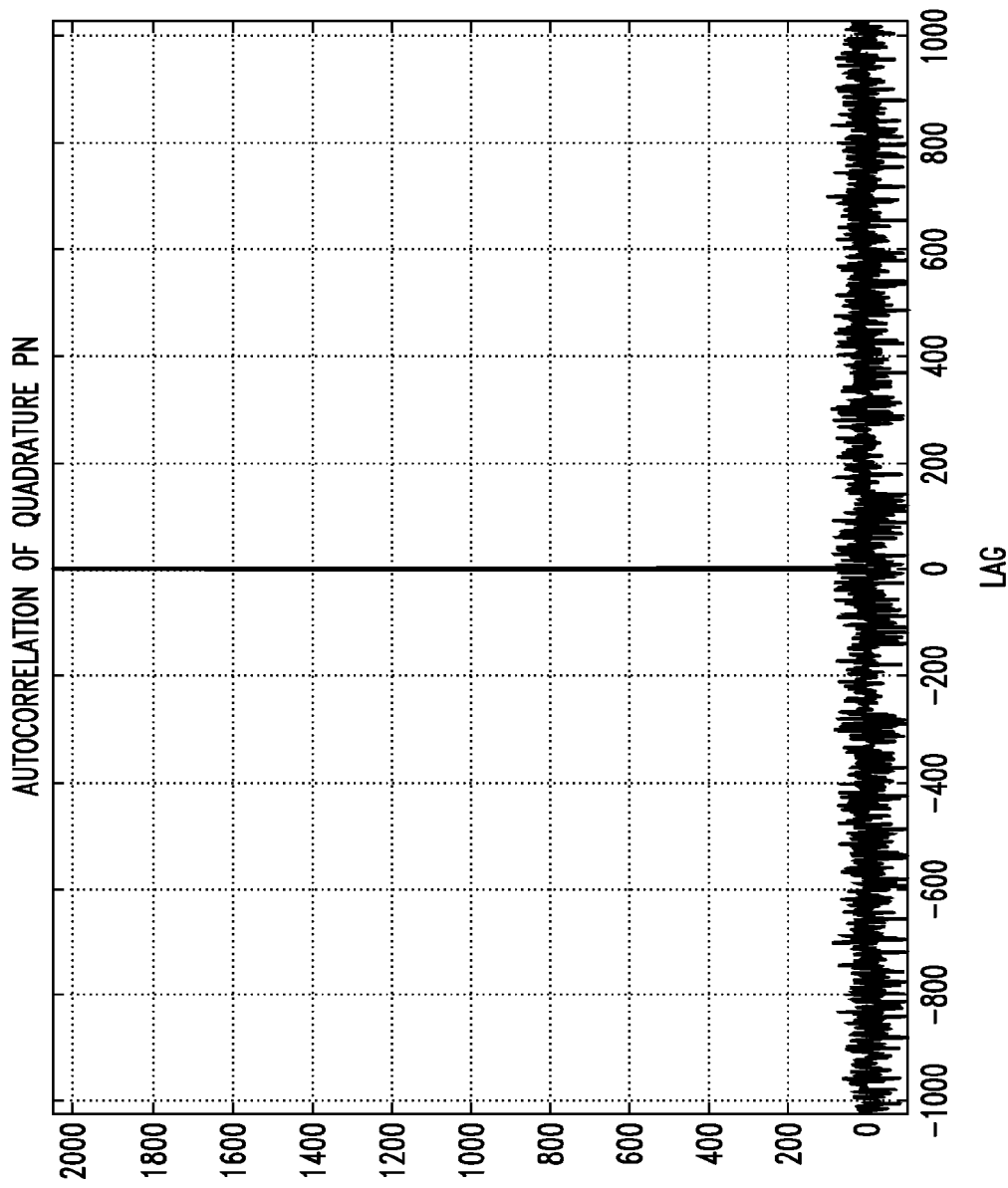
FIG. 6 illustrates the auto-correlation function of the PN sequence utilized in the transmission system of FIGS. 1 and 2.

The auto-correlation function of the PN sequence is shown in FIG. 6. FIG. 6 demonstrates the typical auto-correlation function of maximum length feedback shift register sequences. The illustrative PN sequence used herein has a length of $2^{15}-1$. The Hadamard matrix is then element-wise multiplied by the PN sequence of the appropriate length which is developed according to the linear congruential equation given above.

Figure 7:
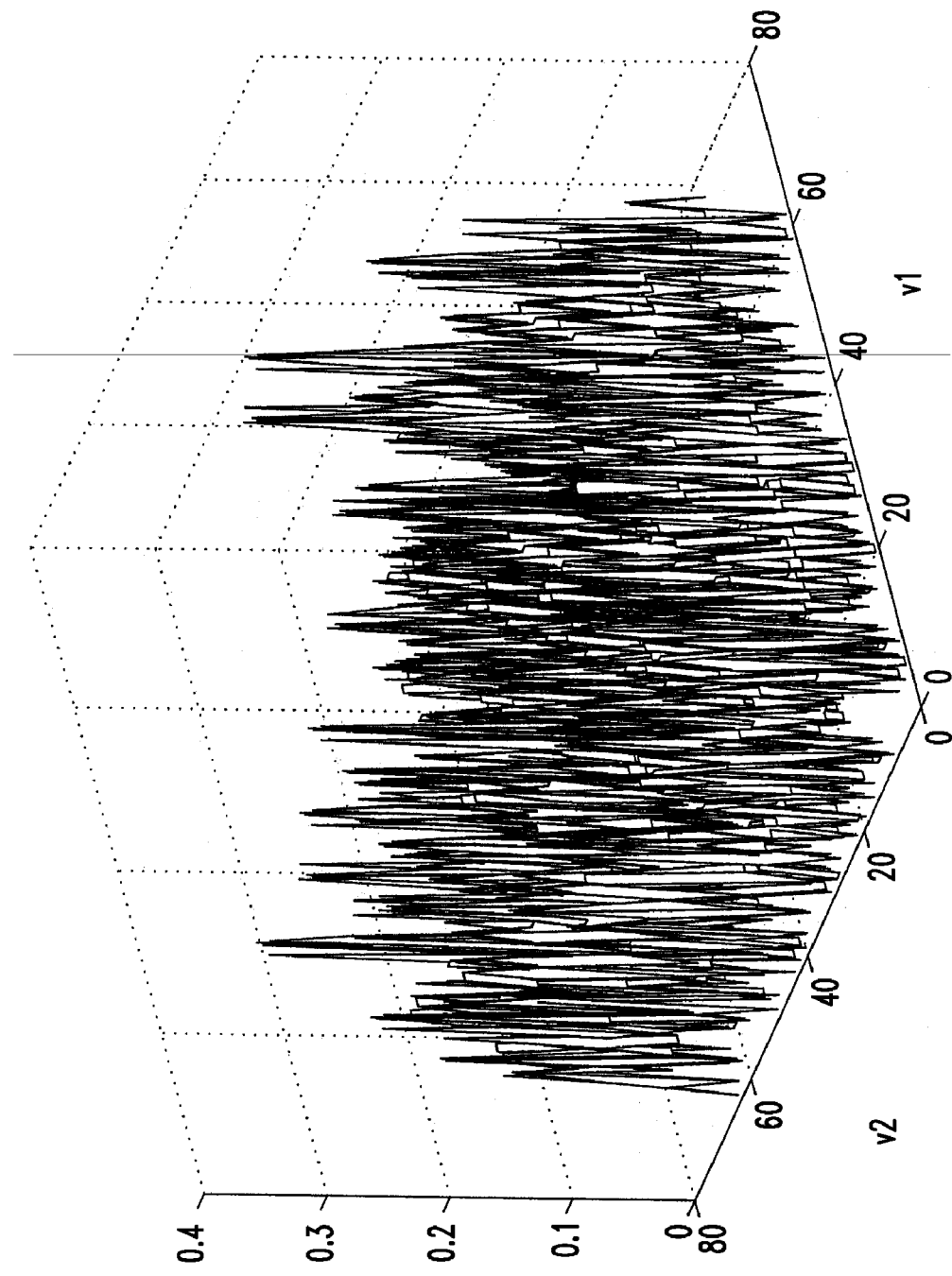
FIGS. 7 and 8 illustrate the auto and cross-correlation where the combined spreading codes and PN sequence are shifted by one unit of time for Walsh codes of length 64 and for Hadamard (4n) codes of length 96, respectively
Figure 8:
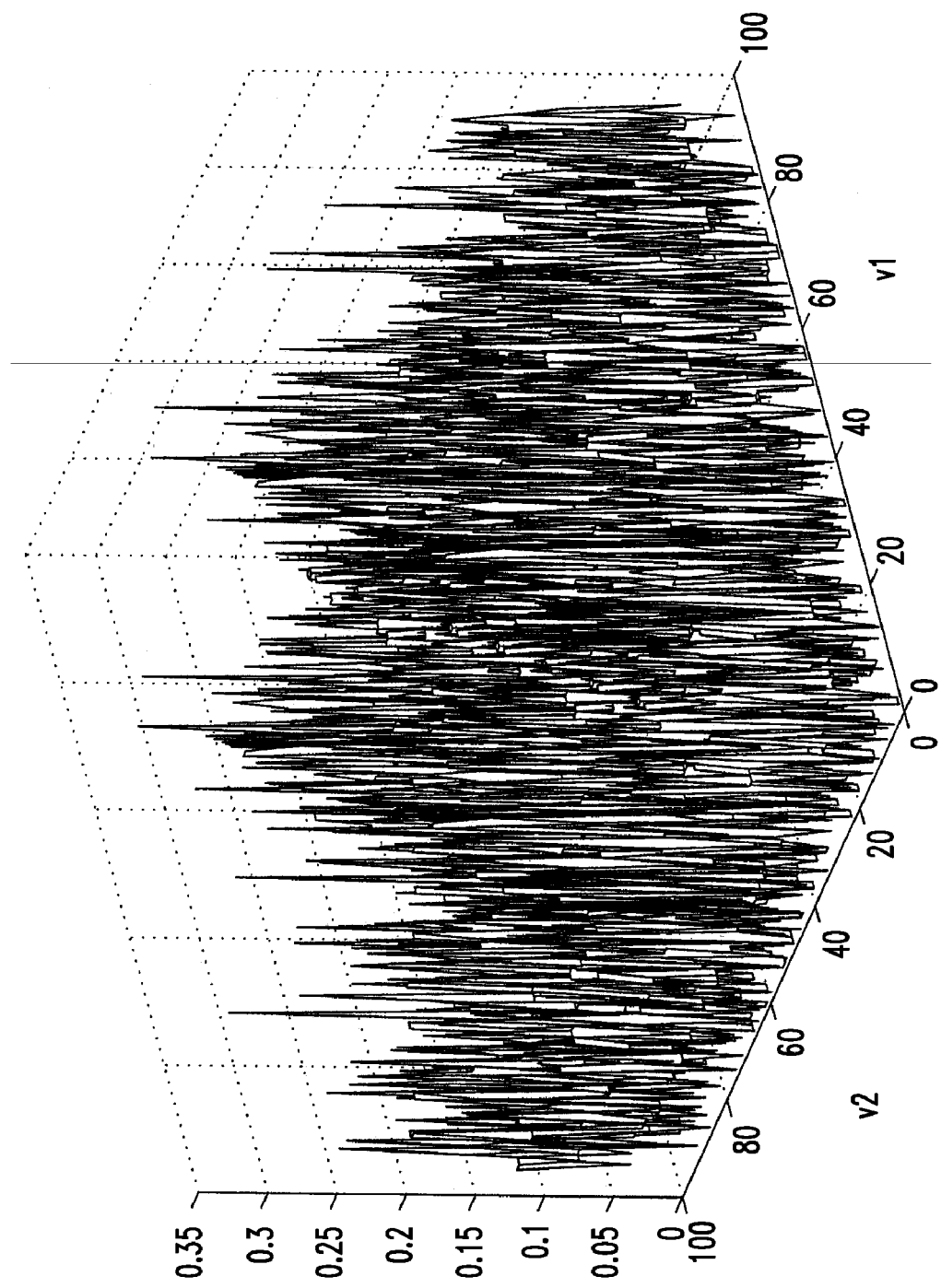

FIGS. 7 and 8 illustrate the auto and cross-correlation where the combined spreading codes and PN sequence are shifted by one unit of time for Walsh codes of length 64 and for Hadamard (4n) codes of length 96, respectively. Thus, in the presence of spreading, the performance of Walsh codes of length 64 and Hadamard (4n) codes of length 96 are similar. Noise is experienced from other codes.

It is to be understood that the embodiments and variations shown and described herein are merely illustrative of the principles of this invention and that various modifications may be implemented by those skilled in the art without departing from the scope and spirit of the invention.

I claim:

1. A method for receiving spread spectrum signals in a communication system comprising:
    decoding said received spread spectrum signal with an orthogonal function sequence to produce a digital signal, wherein the length of said orthogonal function is selected from a group that includes substantially all multiples of four that are not an integral power of two with a range of channels supported by said communication system; and
    detecting a data signal in said digital signal.

2. The method according to claim 1, wherein said orthogonal function sequence is a length of N and is a Hadamard code having a length of 4n, where N equals 4n and n is an integer.

3. The method according to claim 1, further comprising the step of demodulating said spread signal using a PN sequence.

4. The method according to claim 3, further comprising the step of synchronizing said PN sequence to an appropriate lag due to channel transmission delay.

5. The method according to claim 1, further comprising the step of synchronizing said decoding to an appropriate lag due to channel transmission delay.

6. The method according to claim 2, wherein said decoding step is performed for up to 4n data signals.

7. A receiver for receiving spread spectrum signals in a communication system comprising:
    an orthogonal function decoder that combines said received spread spectrum signal with an orthogonal function sequence to produce a digital signal, wherein the length of said orthogonal function is selected from a group that includes substantially all multiples of four that are not an integral power of two within a range of channels supported by said communication system; and
    a processor for detecting a data signal in said digital signal.

8. The receiver according to claim 7, wherein said orthogonal function sequence has a length of N and is a Hadamard code having a length of 4n, where N equals 4n and n is an integer.

9. The receiver according to claim 7, further comprising a decoder for demodulating said spread signal using a PN sequence.

10. The receiver according to claim 9, further comprising means for synchronizing said PN sequence to an appropriate lag due to channel transmission delay.

11. The receiver according to claim 7, further comprising means for synchronizing said orthogonal function decoder to an appropriate lag due to channel transmission delay.

12. The receiver according to claim 7, wherein said orthogonal function decoder processes up to 4n data signals.

* * * * *

UNITED STATES PATENT AND TRADEMARK OFFICE
CERTIFICATE OF CORRECTION

| | | |
|---|---|---|
| PATENT NO. | : 8,155,170 B2 | Page 1 of 1 |
| APPLICATION NO. | : 11/923088 | |
| DATED | : April 10, 2012 | |
| INVENTOR(S) | : Zulfiquar Sayeed | |

It is certified that error appears in the above-identified patent and that said Letters Patent is hereby corrected as shown below:

On the title page, abstract section, line 3, the portion reading "spread spectrum codes Orthogonal spreading codes are used that have lengths" should read --spread spectrum codes. Orthogonal spreading codes are used that have lengths--.

In the Claims:

Column 6, claim 1, line 8, which reads: "not an integral power of two with a" should read to --not an integral power of two within a--; claim 2, line 13, which reads: "function sequence is a length of N" should read --function sequence has a length of N--.

Signed and Sealed this
Sixteenth Day of July, 2013

Teresa Stanek Rea
*Acting Director of the United States Patent and Trademark Office*